Oct. 6, 1959

P. M. ENGLE ET AL 2,907,407

FILTER CONSTRUCTION

Filed Oct. 25, 1954

INVENTOR.
Paul M. Engle and
BY John R. Swanton, Jr.
Herman Seid
atty.

United States Patent Office 2,907,407
Patented Oct. 6, 1959

2,907,407
FILTER CONSTRUCTION

Paul M. Engle, Clay, N.Y., and John R. Swanton, Jr., Newton, Mass.; said Engle assignor to Cambridge Filter Manufacturing Corporation, Syracuse, N.Y., a corporation of New York, and said Swanton assignor to Arthur D. Little, Inc., Cambridge, Mass., a corporation of Massachusetts Application October 25, 1954, Serial No. 464,491

15 Claims. (Cl. 183—71)

This invention relates to filter construction and more particularly to a filter so formed that the filter medium may be replaced after it has lost its efficiency by merely substituting a new package for the used filter package.

The chief object of the present invention is to provide a simple, inexpensive filter construction so formed that filtering medium is easily replaced when its efficiency is reduced due to the collection of dust and dirt particles thereon.

An object of the invention is to provide a replaceable package which may be placed within a filter frame in use and removed therefrom and substituted by a new package after its efficiency has been reduced.

Other objects of the invention will be readily perceived from the following description.

This invention relates to a filter construction which comprises a frame having at least two open sides, a base member extending across one of the open sides from the walls of the frame, and a plurality of supporting members mounted on the base member and extending within the frame to support filter medium, the supporting members being spaced a desired distance from the walls of the frame. Preferably the supporting members comprise pleated wire mesh or a series of bent wires attached to the base member which may comprise wire mesh or a plurality of spaced rods attached to the walls of the frame.

This invention further relates to a replaceable filter package which comprises a frame having at least two open sides, a filter arrangement arranged in pleated form having its ends secured to the walls of the frame and support members extending between the walls of the frame to retain the filter medium in pleated formation. Preferably, the ends of the support members are embedded in the walls of the frame.

The attached drawings illustrate a preferred embodiment of the invention in which.

Figure 1:
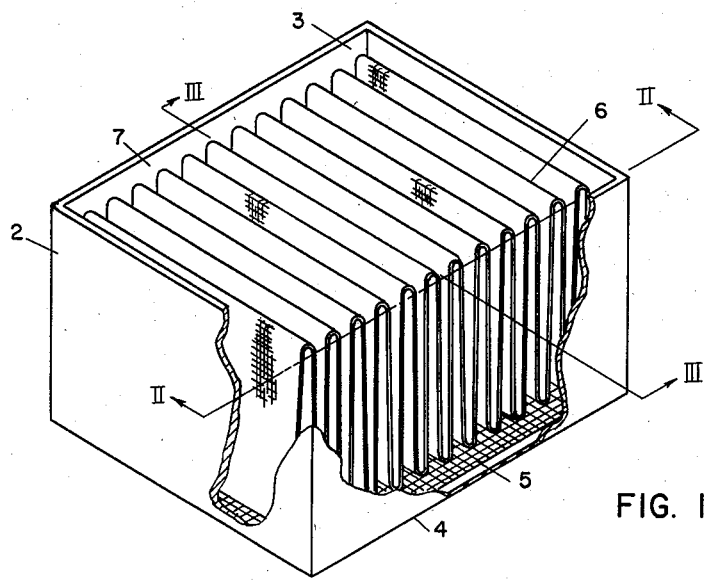
Figure 1 is an isometric view of the filter frame, portions being broken away to disclose the construction of the frame.
Figure 2:
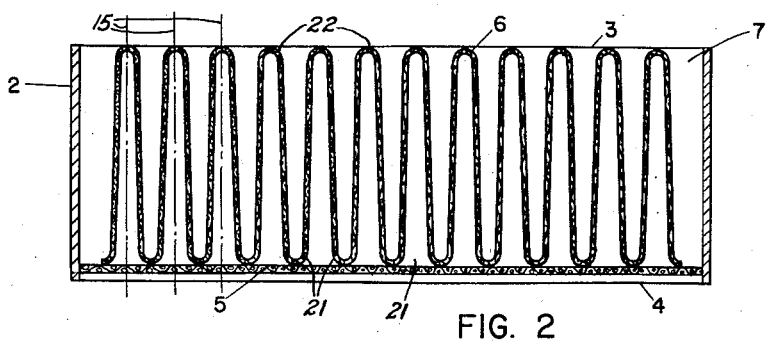
Figure 2 is a sectional view taken on the line II—II of Figure 1.
Figure 3:
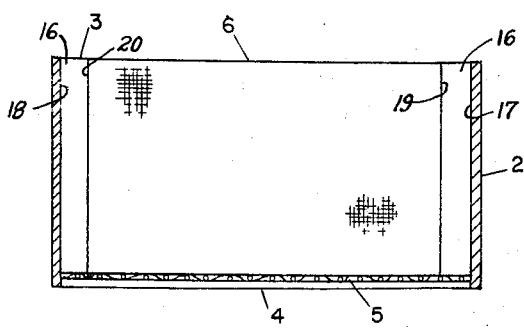
Figure 3 is a sectional view taken on the line III—III of Figure 1.

Referring to the drawings, there is shown in Figure 1, the frame of the filter construction of the present invention. The structure shown in Figure 1 comprises a steel frame member 2 having at least two open sides 3 and 4, which form an inlet and an outlet for the passage of air therefrom. A base member 5 extends across the outlet 4 from the walls of the frame. Preferably, base 5 is formed of heavy wire mesh or rods which may be welded or secured in other suitable manner to the sides of walls 2. The base 5 constitutes a rectangular supporting grid structure located in spaced relation from the open side 3, and in parallel relation thereto. Mounted on base 5 and attached thereto in any suitable manner is a plurality of supporting members 6 which serve as the mounting member or support for the filter medium of the package, as hereinafter described. Preferably, supporting members 6 are formed of pleated wire mesh or bent wires to support pleated filter medium in desired position within the construction. The support members 6 are spaced on all sides from frame 2 as shown at 7 in order to permit the frame of the replaceable package to extend between the supports 6 and frame 2, as hereinafter described. The members 6 constitute substantially V sectioned grids which are substantially symmetrical about their respective median planes indicated at 15. Such grids are of a length less than the internal dimension of the open side 3 of the frame 2 to leave end spaces 16 between the end walls 17 and 18, and the ends 19 and 20 of the grids, as shown in Figure 3. Each V sectioned portion of the grid is supported with its wide end 21 upon the grid 5, and with its narrow end 22 lying substantially in the plane of the open side 3.

Figure 4:
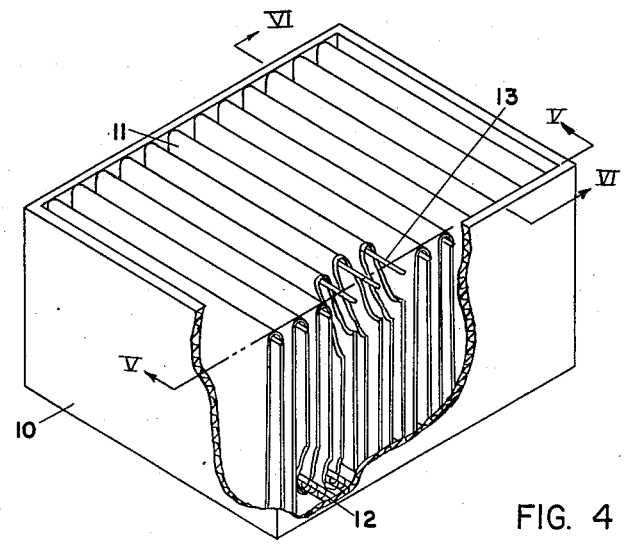
Figure 4 is an isometric view of the replaceable filter package, portions being broken away to disclose the construction of the package.
Figure 5:
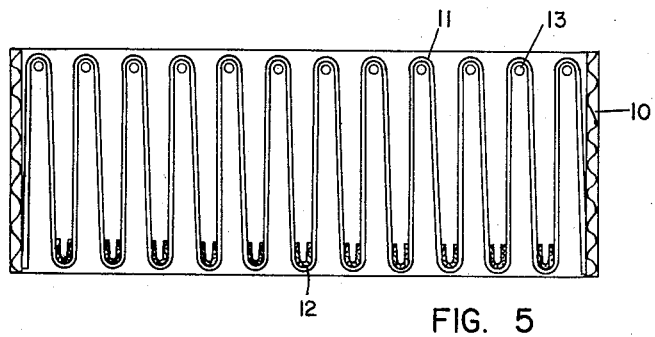
Figure 5 is a sectional view on the line V—V of Figure 4.
Figure 6:
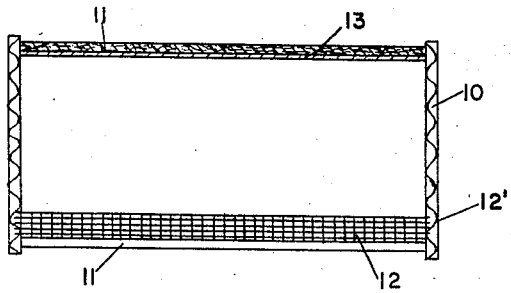
Figure 6 is a sectional view taken on the line VI—VI of Figure 4.

Referring to Figures 4, 5 and 6, there is shown the replaceable filter package of the present invention. The package comprises a frame 10 of corrugated board or other material having pleated filter medium 11 arranged therein and extending from side to side of the frame. Preferably, the frame is adhesively secured to the ends of the filter medium in order to prevent by-passing of fluid to be filtered when the filter construction is in use. To aid in maintaining the pleated formation of filter medium 11, support members 12 are provided which extend from wall to wall of the frame 10 adjacent the lowermost portion of each pleat of the filter medium. These supports 12 may be formed of wires, rods, or angles of wire mesh or sheet metal and the like. The ends of supports 12 are embedded in the frame 10 as shown at 12′ to aid in securing the filter medium in desired position within the frame. If desired, similar supports 13 may extend from side to side of the frame through the pleats of the filter and adjacent to the uppermost portion of each pleat. It will be understood that each pleat comprises planar portions extending from each fold to the adjacent fold, and each planar portion includes the supported area that is supported against collapse from pressure differential by the pleats formed from the wire mesh.

Considering the manner in which the replaceable package is formed, a desired length of filter medium in a desired width is pleated either by machine or by hand, and held in pleated formation on a form. The supports 12 and 13, if supports 13 are employed, are then placed in desired position within the pleated filter medium. A frame of corrugated board or other material having a coating of adhesive thereon is placed about the pleated filter medium while it is supported on the form. The frame may comprise a length of corrugated board sufficient to form the four sides or preferably, is formed of two separate pieces each of which forms two sides of the frame. After the frame is placed about the pleated filter medium, pressure is applied to the frame to embed the ends of the support members in the corrugated board. The same operation adhesively secures the ends of the pleats to the frame to prevent leakage between the filter medium and the frame. The frame is then joined and the package may be removed from the form.

Figure 7:
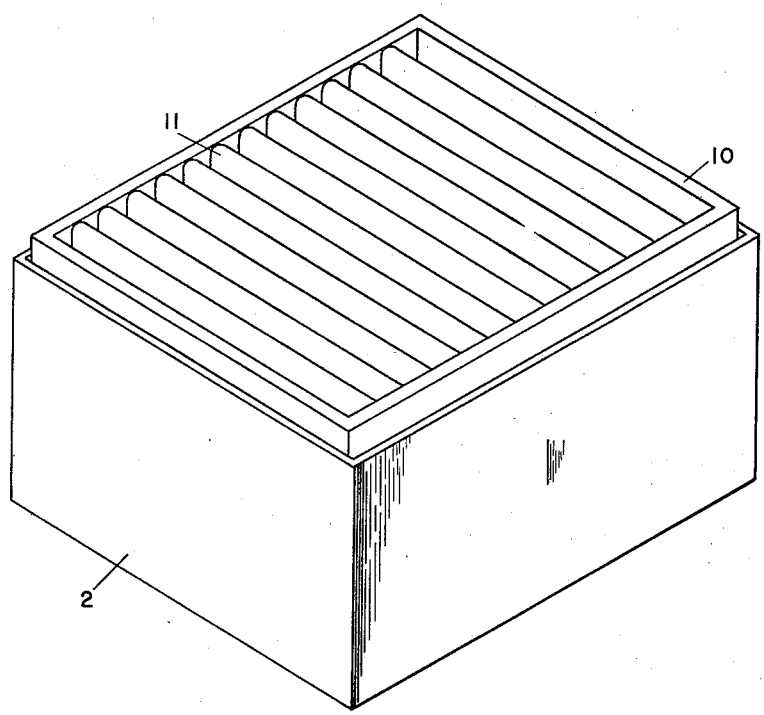
Figure 7 is an isometric view illustrating the filter package placed in the frame shown in Figure 1.

In Figure 7 we have shown the replaceable filter package shown in Figure 4 placed within the frame shown in Figure 1. It will be understood that this package can be easily removed and replaced when dust and dirt particles have collected thereon.

The filter medium may be formed of any desired material which serves to remove dust and dirt particles from air or other fluids passing therethrough. We have found a filter medium of glass wool provides satisfactory results in use.

The present invention provides a simple, inexpensive filter construction which is highly satisfactory to use. The frame of the construction may be placed in desired position within an air passageway and the filter package of my invention placed therein and replaced as required. The filter package of the present invention is readily assembled and decreases the cost involved in shipment, since only the replaceable package need be shipped rather than the complete filter assembly. The invention provides a ready method of assembly of the filter package.

While we have described a preferred embodiment of the invention, it will be understood the invention is not limited thereto, since it may be otherwise embodied within the scope of the following claims.

We claim:

1. In filter construction, the combination of an outer frame having side walls defining two opposite open sides, a grid-like base member extending across one of the open sides from the walls of the frame, a plurality of supporting members mounted on the base member and extending within the frame to support filter medium, said supporting members being spaced a desired distance from the walls of the frame, and a filter package placed within the frame, said filter package comprising an inner frame adapted to be placed within the outer frame in telescopic relation and having side walls defining two opposite open sides, a filter medium arranged in pleated formation having its pleat edges and ends secured and sealed to the walls of the inner frame and support members extending between the walls of the inner frame to retain the filter medium in pleated formation, the package frame fitting in the space between the walls of the outer frame frame and the supporting members, the filter medium resting on and being laterally supported by said supporting members to resist differential pressures on the medium.

2. A filter construction according to claim 1 in which support members of the package are embedded within the walls of the package frame, the support members of the package extending from wall to wall of the package frame and being nested in a fold of each pleat formation.

3. In filter construction, the combination of an outer frame having side walls defining two opposite open sides, a grid-like base member extending across one of the open sides from the walls of the frame, a plurality of supporting members mounted on the base member and extending within the frame to support a filter package, said supporting members being spaced a desired distance from the walls of the frame, a filter package placed within the frame, said package comprising a second frame having side walls defining two opposite open sides placed telescopically within the space between the supporting members and the wall of the first frame, a filter medium arranged in pleated formation resting on said first supporting members and having its ends and pleat edges secured to the walls of the package frame and rod-like supporting members extending between the walls of the package frame and nesting in a fold of each pleat to retain the filter medium in pleated formation.

4. A filter having a replaceable filter package comprising in combination, a filter package unit, a surrounding outer frame adapted to receive the package unit, said unit comprising a rectangular frame having a sheet of filter material formed into a plurality of pleats supported therewithin, with the end edges of said pleats abutting two opposite sides of said frame, and the ends of said sheet being secured to other sides of said frame, the depth of said frame being as great as the height of said pleats, and support members extending between the two opposite sides and nested in the folds of said pleats, said surrounding outer frame having a grid across one side, and supporting grid members mounted on said grid adapted to project into the pleats from one side and support the surfaces of said pleats between adjacent folds against differential pressure from flow of air through the filter toward said grid.

5. In a filter support frame, an encompassing frame, adapted to receive from one open side a plaited filter cartridge, said one side being the air inlet side, a rectangular supporting planar grid structure supported from said frame in spaced, parallel relation to said one side and on the air outflow side of said frame, a plurality of V sectioned grids each composed of members extending lengthwise and crosswise and having their wide ends supported upon said grid structure and their narrow ends disposed substantially in the plane of said one open side, said V sectioned grids being disposed in spaced, parallel relation to each other and extending from the supporting grid structure toward said one side of the frame with their median planes parallel to one another, and disposed at right angles to the plane of the rectangular grid structure, said V sectioned grids being of a height approximately equal to the spacing between the plane of the one open side and the plane of the supporting planar grid structure and each comprising a pair of planar grid areas angularly disposed to each other, and each of said V sectioned grids being substantially of the same length, said length being substantially less than the corresponding inside dimension of the open side to provide clearance for a filter package having a frame of similar shape but somewhat smaller than said encompassing frame.

6. A filter comprising a support frame having a rectangular frame, adapted to receive from one open side a plaited filter cartridge, said one side being the air inlet side, a rectangular supporting planar grid structure supported from said frame in spaced, parallel relation to said one side and on the air outflow side of said frame, a plurality of V sectioned grids having their wide ends supported upon said grid structure and their narrow ends disposed substantially in the plane of said one open side, said V sectioned grids being disposed in spaced, parallel relation to each other and extending from the supporting grid structure toward said one side of the frame with their median planes parallel to one another, and disposed at right angles to the plane of the rectangular grid structure, said V sectioned grids being of a height approximately equal to the spacing between the plane of the one open side and the plane of the rectangular grid structure, and each of said V sectioned grids being substantially of the same length, said length being less than the corresponding inside dimension of the open side, and a filter cartridge supported by said support frame having spaced parallel rectangular end members disposed just beyond the ends of said V grids and within said rectangular frame, and plaited filter material extending between said end members with the plaits extending at right angles to the end members, and supported on the air inlet side of said V grids.

7. In filter construction, the combination of a frame having at least two open sides constituting an air inlet side and an air outlet side, a grid-like base member extending across the outlet side of the frame and permanently secured thereto, a supporting means comprising individual pleats mounted on the base member and extending within the frame and adapted to support the individual pleats of pleated filter medium, said first named pleats being entirely open work and free of filtering material affixed thereto and being of V cross section and of a length less than the width of the frame and each comprising a pair of planar grid areas angularly disposed to each other, and having their ends spaced from said frame, whereby to provide clearance between the said ends, and the frame, whereby to adapt said frame to receive the frame of a filter package.

8. Filter construction according to claim 7 in which the base member comprises wire mesh attached to the frame.

9. In a replaceable unitary filter package, the combination of a frame having side walls defining two opposite open sides, a filter medium comprising a single unbroken sheet arranged in pleated formation and having its ends and pleat edges secured and sealed to the inside walls of the frame, said inside walls of said frame defining clear and unobstructed access to all of the folds of said pleated mdeium, and support members extending between walls of the frame and nested in the folds of the pleats to retain the filter medium in pleated formation, said filter medium being flexible, and being supported solely by said members and walls, and the flanks of said pleats being relatively unsupported against differential pressure, said package being adapted for use with a complemental package support frame whereby to support the flanks of said pleats when operatively associated with said frame.

10. A filter package according to claim 9 in which the frame comprises corrugated fiber board, and the ends of the support members are embedded within the walls of the frame.

11. A filter package according to claim 9 in which the support members comprise rods which extend between and are embedded in opposite walls of the frame and nest within a fold of each pleat.

12. A filter package according to claim 9 in which support members extend from wall to wall of the frame and nest within the folds of each pleat.

13. In a replaceable unitary filter package, the combination of a corrugated board frame forming side walls defining two opposite open sides, a filter medium arranged in pleated formation in said frame and having its ends and pleat edges secured and sealed to the inside walls of the frame, said inside walls of said frame defining clear and unobstructed access to all of the folds of said pleated medium, support members extending between the walls of the frame, the ends of said support members being embedded within the walls of the frame and being nested within a fold of each pleat, and rods extending from wall to wall of the frame and nested in the opposite folds of each pleat to retain the filter medium in pleated formation, said filter medium being flexible, and being supported solely by said members and walls, and the flanks of said pleats being relatively unsupported against differential pressure, said package being adapted for use with a complemental package support frame whereby to support the flanks of said pleats when operatively associated with said frame.

14. A filter construction comprising the combination of a rectangular housing having side and end walls, said housing being open on opposite sides, a grid-like base structure extending across one of the open sides of the housing and being permanently secured thereto, a supporting means comprising grid-like individual pleats mounted on the base member and extending within the housing to support individual pleats of pleated filter medium, said first named pleats being of a length less than the width of said housing and being of V cross section in planes parallel with the side walls of the housing, and having their ends spaced from said housing, whereby to provide clearance between the said ends and the housing to telescopically receive the frame of a filter cartridge, and a filter cartridge having a frame telescopically disposed within said housing, and pleated filter material disposed complementally to said grid-like supporting first named pleats, said filter cartridge being otherwise independent of said housing and grid-like supporting first named pleats.

15. A filter support construction for a complemental filter cartridge having filter material arranged in pleats wherein each pleat is composed of planar portions, requiring support against differential pressure, comprising, the combination of a rectangular housing having at least two open sides, a grid-like base member extending across one of the open sides of the housing and being permanently secured thereto, a supporting means comprising individual pleats mounted on the base member and extending within the housing to support planar portions only of the individual pleats of the pleated filter medium, said supporting pleats being of a length less than the width of said housing and open at their ends and each having two planar grids angularly disposed in respect to each other, and having their ends spaced from said housing, whereby to provide clearance between the said ends and the housing to receive the frame of the pleated filter medium cartridge.

References Cited in the file of this patent

UNITED STATES PATENTS

| | | |
|---|---|---|
| 2,016,992 | Dollinger | Oct. 8, 1935 |
| 2,071,806 | Walker | Feb. 23, 1937 |
| 2,080,154 | Strindberg | May 11, 1937 |
| 2,130,107 | Somers | Sept. 13, 1938 |
| 2,232,065 | Hasselwander | Feb. 18, 1941 |
| 2,479,722 | Brixius | Aug. 23, 1949 |